(12) United States Patent
Kim

(10) Patent No.: US 8,711,302 B2
(45) Date of Patent: Apr. 29, 2014

(54) LIQUID CRYSTAL DISPLAY

(75) Inventor: Dong-Gyu Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 12/954,463

(22) Filed: Nov. 24, 2010

(65) Prior Publication Data

US 2011/0069259 A1 Mar. 24, 2011

Related U.S. Application Data

(62) Division of application No. 11/949,515, filed on Dec. 3, 2007, now abandoned.

(30) Foreign Application Priority Data

Dec. 11, 2006 (KR) .......................... 10-2006-0125428

(51) Int. Cl.
*G02F 1/1333* (2006.01)
*G02F 1/1343* (2006.01)

(52) U.S. Cl.
USPC .............................. 349/110; 349/38; 349/145

(58) Field of Classification Search
USPC ............................... 349/38–42, 110, 139, 145
See application file for complete search history.

(56) References Cited

U.S. PATENT DOCUMENTS

| | | | |
|---|---|---|---|
| 6,710,825 B2 | 3/2004 | Kubo et al. | |
| 6,903,754 B2 | 6/2005 | Brown Elliott | |
| 6,956,633 B2 * | 10/2005 | Okada et al. .................. | 349/139 |
| 7,242,452 B2 * | 7/2007 | Jeong et al. .................. | 349/145 |
| 7,812,911 B2 * | 10/2010 | Song ............................ | 349/145 |
| 7,924,387 B2 | 4/2011 | Hung | |
| 8,035,610 B2 * | 10/2011 | Hsu .............................. | 345/103 |

FOREIGN PATENT DOCUMENTS

| | | |
|---|---|---|
| JP | 11-242244 | 9/1999 |
| JP | 2001-264818 | 9/2001 |
| JP | 2001-281696 | 10/2001 |

* cited by examiner

*Primary Examiner* — Dung Nguyen
(74) *Attorney, Agent, or Firm* — Innovation Counsel LLP

(57) ABSTRACT

A liquid crystal display includes: a plurality of pixel electrodes each having a first sub-pixel electrode and a second sub-pixel electrode that face each other in a diagonal direction; a plurality of gate lines; and a plurality of data lines that intersect the plurality of gate lines and at least partially overlap the pixel electrodes.

9 Claims, 13 Drawing Sheets

LIQUID CRYSTAL DISPLAY

CROSS-REFERENCE TO RELATED APPLICATION

This application is a Divisional of U.S. patent application Ser. No. 11/949,515 filed on Dec. 3, 2007, which claims priority to and the benefit of Korean Patent Application No. 10-2006-0125428 filed in the Korean Intellectual Property Office on Dec. 11, 2006, the entire contents of which are incorporated herein by reference.

BACKGROUND OF THE INVENTION

1. Field of the Invention

The present invention relates to a liquid crystal display.

2. Description of the Related Art

Liquid crystal displays are now the most widely used of the flat panel displays. The liquid crystal displays have two display panels on which electric field generating electrodes such as pixel electrodes and a common electrode are formed, and a liquid crystal layer interposed between the panels. In the liquid crystal displays, a voltage is applied to the electric field generating electrodes so as to generate an electric field in the liquid crystal layer. The alignment of liquid crystal molecules of the liquid crystal layer is determined by the electric field. Accordingly, the polarization of incident light is controlled, thereby providing image display.

The liquid crystal displays also include switching elements connected to the individual pixel electrodes and a plurality of signal lines, such as gate lines and data lines, for controlling the switching elements so as to apply voltages to the pixel electrodes.

In order to prevent a degradation phenomenon that occurs when the electric field is applied in the liquid crystal layer in one direction for a long time, polarities of the data voltage with respect to a common voltage are inverted for every frame, every row, or every pixel.

In these liquid crystal displays, a high-speed driving method is used so as to improve a motion picture display characteristic. However, because high-speed driving requires a larger amount of electric power as the frame speed increases, column inversion is used once per frame to minimize power consumption.

However, the column inversion causes a coupling defect and a stripe defect. Parasitic capacitance arising from an overlap between the data lines and the pixel electrodes causes a data voltage having the same polarity to be continuously applied throughout a frame, thereby generating a coupling defect that causes the upper and lower parts of the display panel of the liquid crystal panel assembly to display images with different luminances. In particular, if a box having a high grayscale level is displayed on a background image having a low grayscale level, a vertical crosstalk phenomenon may occur such that the upper portion and the lower portion of the box have grayscales different from the background image.

The stripe defect refers to a phenomenon in which stripes appear when a data voltage having the same polarity is applied in a vertical direction so that a data voltage having a positive polarity creates an image that is different from a data voltage having a negative polarity.

SUMMARY OF THE INVENTION

An exemplary embodiment of the present invention provides a liquid crystal display that prevents the coupling defect and the stripe defect comprising: a plurality of pixel electrodes each having a first sub-pixel electrode and a second sub-pixel electrode that face each other in a diagonal direction and are connected to each other; a plurality of gate lines; and a plurality of data lines that intersect the plurality of gate lines and at least partially overlap the pixel electrodes.

Each of the first and second sub-pixel electrodes may include first and second edges that are parallel to the gate line, and third and fourth edges that are parallel to the data line.

The liquid crystal display may further include a plurality of thin film transistors connected to the gate lines, the data lines, and the pixel electrodes.

The data lines may include a first data line connected to the pixel electrodes through the thin film transistors and second and third data lines that are adjacent to the first data line, and the pixel electrodes may overlap all of the first to third data lines.

The first data line may overlap both the first and second sub-pixel electrodes, the second data line may overlap the first sub-pixel electrodes, and the third data line may overlap the second sub-pixel electrodes.

Data voltages having the same polarity may be applied to the second and third data lines, and the polarity of the data voltage applied to the first data line may be opposite to that of the data voltage applied the second and third data lines.

The plurality of thin film transistors connected to the pixel electrodes that are adjacent in the column direction may be alternately disposed at both sides of the data line.

The liquid crystal display may further include an organic film formed between the pixel electrodes and the data lines.

The liquid crystal display may further include storage electrode lines that overlap the pixel electrodes.

An opening may be formed in the organic film at a position where each storage electrode line overlaps a pixel electrode.

Each thin film transistor may include a drain electrode connected to the pixel electrode, and at least a portion of the drain electrode may overlap the storage electrode line.

The liquid crystal display may further include a plurality of color filters that are formed between the pixel electrodes and the data lines.

An opening may be formed in each color filter at a position where the storage electrode line overlaps the pixel electrode.

The liquid crystal display may further include a common electrode that faces the pixel electrodes, and a liquid crystal layer interposed between the common electrode and the pixel electrodes. The liquid crystal molecules in the liquid crystal layer may be arranged in parallel with the pixel electrodes and the common electrodes when no electric field is applied.

The liquid crystal display may further include a common electrode that faces the pixel electrodes, and a liquid crystal layer interposed between the common electrode and the pixel electrodes. The liquid crystal molecules in the liquid crystal layer may be aligned in a splay alignment mode when no electric field is applied, and aligned in a bend alignment mode when the electric field is generated.

Another embodiment of the present invention provides a liquid crystal display including: a plurality of pixel electrodes; a plurality of gate lines that transmit gate signals to the pixel electrodes; and a plurality of data lines that intersect the gate lines and transmit data voltages to the pixel electrodes. Each data line overlaps a pixel electrode and includes a first portion that lies on a first imaginary straight line and a second portion that lies on a second imaginary straight line which is separated from and parallel to the first imaginary straight line.

The first and second portions of the data lines may overlap different pixel electrodes.

The pixel electrode may include first and second edges that are parallel to the gate lines, and third and fourth edges that are parallel to the data lines.

The liquid crystal display may further include a plurality of storage electrode lines that overlap the pixel electrodes.

The liquid crystal display may further include a light blocking member disposed between adjacent pixel electrodes.

The light blocking member may include a first light blocking member that is adjacent to the first portion of the data line and a second light blocking member that is adjacent to the second portion of the data line.

The first light blocking member may be separated from the second light blocking member, and the first light blocking member may be connected to the storage electrode line.

The light blocking member may be formed of the same material as the storage electrode line.

The liquid crystal display may further include an organic film formed between the pixel electrodes and the data lines.

An opening may be formed in the organic film at a position where the storage electrode line overlaps the pixel electrode.

The liquid crystal display may further include a plurality of color filters that are formed between the pixel electrodes and the data lines.

An opening may be formed in the color filter at a position where the storage electrode line overlaps the pixel electrode.

The liquid crystal display may further include a plurality of thin film transistors connected to the gate lines, the data lines, and the pixel electrodes. The plurality of thin film transistors connected to the pixel electrodes that are adjacent in the column direction may be alternately disposed at both sides of the data line.

Data voltages having opposite polarities may be applied to the two adjacent data lines.

The liquid crystal display may further include a common electrode that faces the pixel electrodes, and a liquid crystal layer interposed between the common electrode and the pixel electrodes. The liquid crystal molecules in the liquid crystal layer may be arranged in parallel with the pixel electrodes and the common electrodes when no electric field is applied.

The liquid crystal display may further include a common electrode that faces the pixel electrodes, and a liquid crystal layer interposed between the common electrode and the pixel electrodes. The liquid crystal molecules in the liquid crystal layer may be aligned in a splay alignment mode when no electric field is applied, and aligned in a bend alignment mode when the electric field is generated.

DETAILED DESCRIPTION OF THE EMBODIMENTS

Figure 1:
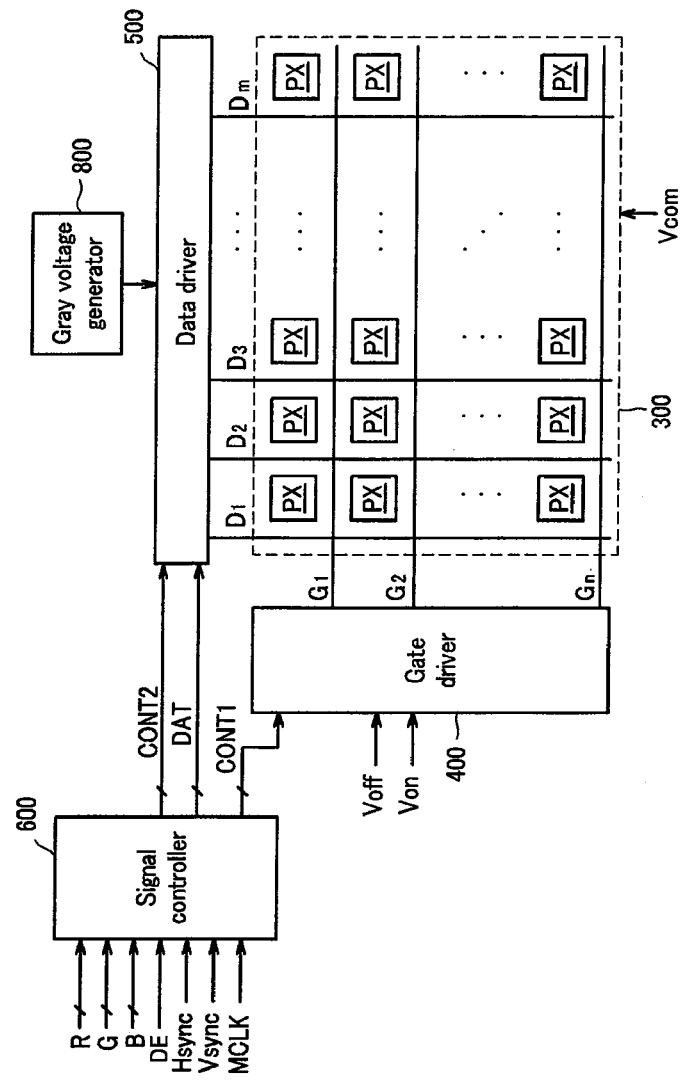
FIG. 1 is a block diagram of a liquid crystal display according to an exemplary embodiment of the present invention.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to an exemplary embodiment of the present invention will be described in detail with reference to FIGS. 1 and 2.

Figure 2:
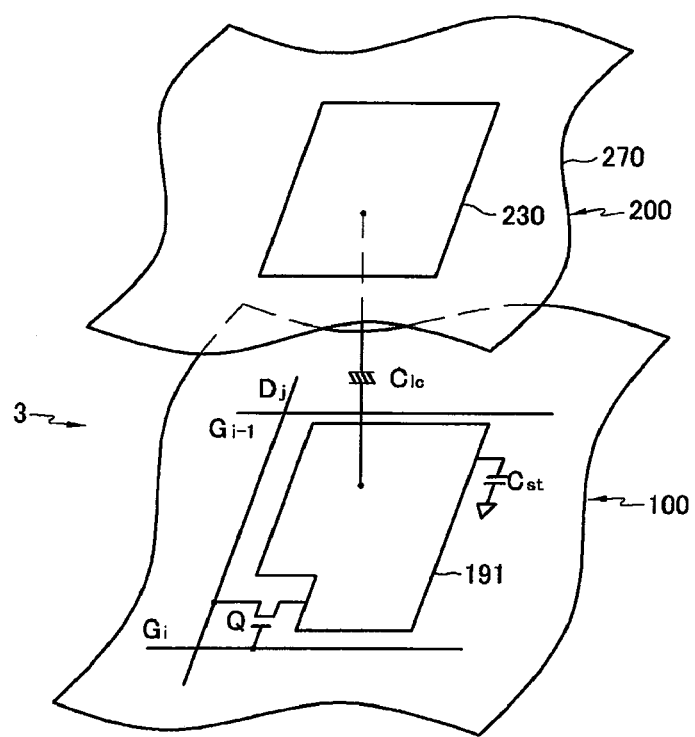
FIG. 2 is an equivalent circuit diagram of one pixel in the liquid crystal display according to the exemplary embodiment of the present invention.

FIG. 1 is a block diagram of a liquid crystal display according to an exemplary embodiment of the present invention, and FIG. 2 is an equivalent circuit diagram of one pixel in a liquid crystal display according to an exemplary embodiment of the present invention.

Referring to FIG. 1, a liquid crystal display according to an exemplary embodiment of the present invention includes a liquid crystal panel assembly 300, a gate driver 400, a data driver 500, a gray voltage generator 800, and a signal controller 600.

In an equivalent circuit, the liquid crystal panel assembly 300 includes a plurality of signal lines $G_1$ to $G_n$ and $D_1$ to $D_m$, and a plurality of pixels PX that are connected to the plurality of signal lines and are arranged approximately in a matrix. Referring to the structure shown in FIG. 2, the liquid crystal panel assembly 300 includes lower and upper display panels 100 and 200 that face each other, and a liquid crystal layer 3 that is interposed between the lower and upper display panels 100 and 200.

The signal lines $G_1$ to $G_n$ and $D_1$ to $D_m$ include a plurality of gate lines $G_1$ to $G_n$ that transmit gate signals (also referred to as "scanning signals"), and a plurality of data lines $D_1$ to $D_m$ that transmit data signals. The gate lines $G_1$ to $G_n$ substantially extend in a row direction and are in parallel with one another, and the data lines $D_1$ to $D_m$ substantially extend in a column direction and are in parallel with one another.

For example, the pixel PX connected to an i-th gate line Gi (i=1, 2, . . . , n) and a j-th data line Gj (j=1, 2, . . . , m) includes a switching element Q and a liquid crystal capacitor Clc, and a storage capacitor Cst connected thereto. The storage capacitor Cst may be omitted if necessary The switching element Q is a three terminal element such as a thin film transistor that is provided in the lower display panel 100. A control terminal thereof is connected to the gate line Gi, an input terminal thereof is connected to a data line Dj, and an output terminal is connected to the liquid crystal capacitor Clc and the storage capacitor Cst.

The liquid crystal capacitor Clc includes a pixel electrode 191 of the lower display panel 100 and a common electrode 270 of the upper display panel 200 as two terminals, and the liquid crystal layer 3 between the two electrodes 191 and 270 functions as a dielectric. The pixel electrode 191 is connected to the switching element Q, and the common electrode 270 is formed on the entire surface of the upper display panel 200 and has a common voltage Vcom applied therewith. Unlike the structure shown in FIG. 2, the common electrode 270 may be provided on the lower display panel 100, and in this case, at least one of the two electrodes 191 and 270 may be formed in a linear or rod shape.

The storage capacitor Cst that supplements the liquid crystal Clc is formed such that an additional signal line (not shown) provided in the lower display panel 100 and the pixel electrode 191 overlaps an insulating material interposed therebetween. The additional signal line is supplied with a predetermined voltage such as a common voltage Vcom. However, the storage capacitor Cst may be formed by overlapping the pixel electrode 191 and a previous gate line formed directly on the pixel electrode with the insulating material therebetween.

To provide a color display, each pixel PX displays one of the primary colors (spatial division), or the pixels PX alternately display the primary colors with time (temporal division), which causes the primary colors to be spatially and temporally synthesized, thereby displaying a desired color. The primary colors may be composed of, for example, red, green, and blue. As an example of the spatial division, FIG. 2 shows that each pixel PX has a color filter 230 for displaying one of the primary colors in a region of the upper display panel 200 corresponding to the pixel electrode 191. Unlike the structure shown in FIG. 2, the color filter 230 may be provided above or below the pixel electrode 191 of the lower display panel 100.

At least one polarizer (not shown) for polarizing light is mounted on an outer surface of the liquid crystal panel assembly 300.

Referring to FIG. 1 again, the gray voltage generator 800 generates all gray voltages related to the transmittance of the pixel PX, or a limited number of gray voltages (hereinafter, referred to as "reference gray voltages"). However, the gray voltage generator 800 may generate only a given number of gray voltages (referred to as reference gray voltages) instead of generating all of the gray voltages. The (reference) gray voltages may have a positive value with respect to the common voltage Vcom and a negative value with respect to the common voltage Vcom.

The gate driver 400 is connected to the gate lines $G_1$ to $G_n$ of the liquid crystal panel assembly 300, and supplies gate signals each of which is composed of a combination of a gate-on voltage Von and a gate-off voltage Voff to the gate lines $G_1$ to $G_n$.

The data driver 500 is connected to the data lines $D_1$ to $D_m$ of the liquid crystal panel assembly 300, selects the gray voltage generated by the gray voltage generator 800, and supplies the selected gray voltage to the data lines $D_1$ to $D_m$ as a data voltage. However, when the gray voltage generator 800 does not supply all of the gray voltages, but supplies only a predetermined number of reference gray voltages, the data driver 500 divides the reference gray voltage to select a desired data voltage from the generated gray voltages.

The signal controller 600 controls, for example, the gate driver 400 and the data driver 500.

Each of the drivers 400, 500, 600, and 800 may be directly mounted on the liquid crystal panel assembly 300 in the form of at least one IC chip, may be mounted on a flexible printed circuit film (not shown) and then mounted on the liquid crystal panel assembly 300 in the form of a TCP (tape carrier package), or may be mounted on a separate printed circuit board (not shown). Alternatively, the drivers 400, 500, 600, and 800 may be integrated into the liquid crystal panel assembly 300 together with, for example, the signal lines $G_1$ to $G_n$ and D1 to Dm and the thin film transistor switching elements Q. The drivers 400, 500, 600, and 800 may be integrated into a single chip. In this case, at least one of the drivers or at least one circuit forming the drivers may be arranged outside the single chip.

Hereinafter, the operation of the liquid crystal display will be described in detail.

The signal controller 600 receives input image signals R, G, and B and input control signals for displaying the input image signals from an external graphics controller (not shown). The input image signals R, G, and B include luminance information of each pixel PX, and the luminance has a predetermined number of grayscale levels, for example 1024 ($=2^{10}$), 256 ($=2^8$), or 64 ($=2^6$) levels. For example, any of the following signals may be used as the input control signal: a vertical synchronization signal Vsync, a horizontal synchronization signal Hsync, a main clock signal MCLK, and a data enable signal DE.

The signal controller 600 processes the input image signals R, G, and B so as to be suitable for the operational conditions of the liquid crystal panel assembly 300 on the basis of the input image signals R, G, and B and the input control signal, and generates, for example, a gate control signal CONT1 and a data control signal CONT2. Then, the signal controller 600 transmits the gate control signal CONT1 to the gate driver 400 and transmits the data control signal CONT2 and the processed image signal DAT to the data driver 500.

The gate control signal CONT1 includes a scanning start signal STV for indicating the start of scanning, and at least one clock signal for controlling the output cycle of the gate-on voltage Von. The gate control signal CONT1 may further include an output enable signal OE for defining the duration of the gate-on voltage Von.

The data control signal CONT2 includes a horizontal synchronization start signal STH for indicating that the transmission of data to a row of pixels PX starts, a load signal LOAD for allowing data voltages to be transmitted to the data lines D1 to Dm, and a data clock signal HCLK. The data control signal CONT2 may further include an inversion signal RVS for inverting the polarity of the data voltage with respect to the common voltage Vcom (hereinafter, "the polarity of data voltage with respect to the common voltage" is simply referred to as "the polarity of a data voltage").

The data driver 500 receives the digital image signal DAT for a row of pixels PX in response to the data control signal CONT2 transmitted from the signal controller 600, selects a gray voltage corresponding to each digital image signal DAT, converts the digital image signal DAT into an analog data signal, and supplies the analog data signal to the corresponding data lines D1 to Dm.

The gate driver 400 applies the gate-on voltage Von to the gate lines $G_1$ to $G_n$ on the basis of the gate control signal CONT1 from the signal controller 600 to turn on the switching elements Q connected to the gate lines $G_1$ to $G_n$. Then, the data voltages applied to the data lines $D_1$ to $D_m$ are supplied to the corresponding pixels PX through the switching elements Q that are in an on state.

The difference between the voltage of the data voltage applied to the pixel PX and the common voltage Vcom is a charging voltage of the liquid crystal capacitor Clc, that is, a pixel voltage. The alignment directions of liquid crystal molecules depend on the level of the pixel voltage, and cause the polarization of light passing through the liquid crystal layer 3 to vary. The variation in polarization causes a variation in the transmittance of light by the polarizer mounted on the liquid crystal panel assembly 300. Therefore, the pixel PX may display the luminance indicated by the grayscale level of the image signal DAT.

These processes are repeatedly performed for every one horizontal period (which is referred to as "1H" and is equal to one period of the horizontal synchronization signal Hsync and the data enable signal DE). In this way, the gate-on voltage Von is sequentially applied to all the gate lines G1 to Gn, and the data signals are supplied to all the pixels PX, thereby displaying one frame of images.

When one frame has ended, the next frame starts. In this case, the state of the inversion signal RVS applied to the data driver 500 is controlled such that the polarity of the data voltage applied to each pixel PX is opposite to the polarity of the data voltage in the previous frame ("frame inversion"). The polarity of the data signal applied to one data line may be inverted in the same frame according to the characteristic of the inversion signal RVS (for example, row inversion and dot inversion), and the polarities of the data voltages to be applied to a row of pixels may be different from each other (for example, column inversion and dot inversion).

The alignment of the pixels and the signal lines of the liquid crystal panel assembly will be described in detail with reference to FIG. 3.

Figure 3:
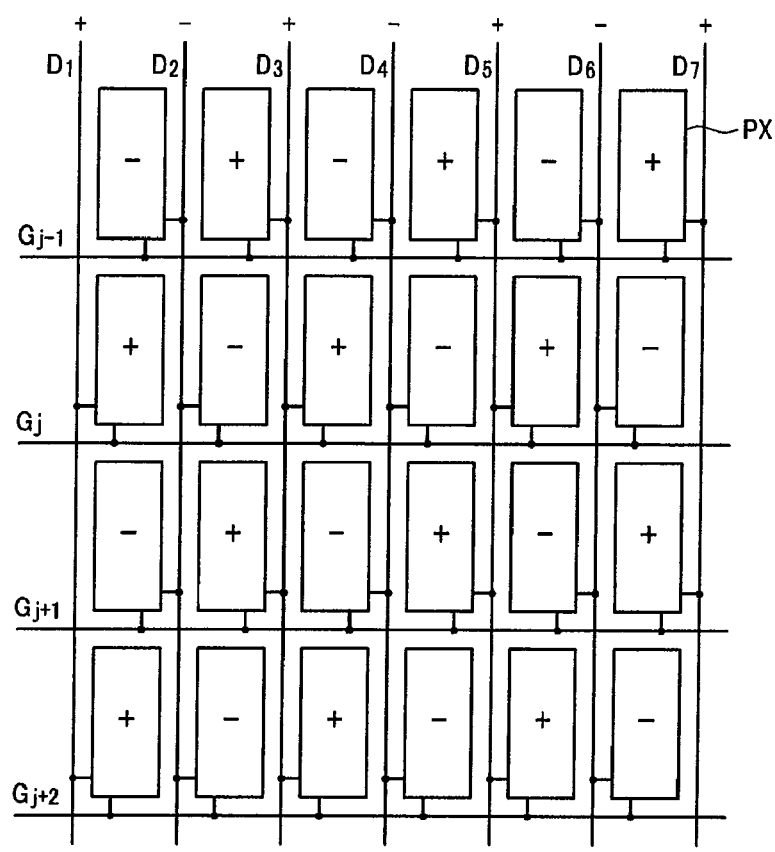
FIG. 3 is a view illustrating the spatial alignment of the pixels and signal lines of the liquid crystal panel assembly according to the exemplary embodiment of the present invention.

FIG. 3 is a view illustrating the spatial alignment of the pixels and the signal lines of the liquid crystal panel assembly according to the exemplary embodiment of the present invention.

For better comprehension and ease of description, only some of the data lines $D_1$ to $D_7$ and some of the gate lines $G_{j-1}$ to $G_{j+2}$ are shown.

Referring to FIG. 3, a row of pixels PX is connected to the gate lines $G_{j-1}$ to $G_{j+2}$ and the data lines $D_1$ to $D_7$ through the switching elements Q. In the pixels PX disposed in the same row, all the pixels disposed in first and third rows are connected to the data lines $D_2$, $D_4$, and $D_6$ on the right sides of the pixels PX, and all the pixels disposed on second and fourth rows are connected to the data lines $D_1$, $D_3$, $D_5$, and $D_7$ on the left sides of the pixels PX.

The pixels PX disposed in the same column are alternatively connected to the data lines $D_1$ to $D_7$ on the right and left sides of the pixels PX.

Further, data voltages having opposite polarities are applied to every two adjacent data lines $D_1$ to $D_7$. That is, the polarity of the data voltage to be applied to odd-numbered data lines $D_1$, $D_3$, $D_5$, and $D_7$ are positive and the polarity of the data voltage to be applied to even-numbered data lines $D_2$, $D_4$, to $D_6$ are negative.

Therefore, positive and negative data voltages are alternatively applied to the pixels PX (hereinafter, referred to as "pixel polarity"), which causes dot inversion thereby preventing the stripe defect from occurring.

Hereinafter, the liquid crystal panel assembly according to the exemplary embodiment of the present invention will be described in detail with reference to FIGS. 4 to 6.

Figure 4:
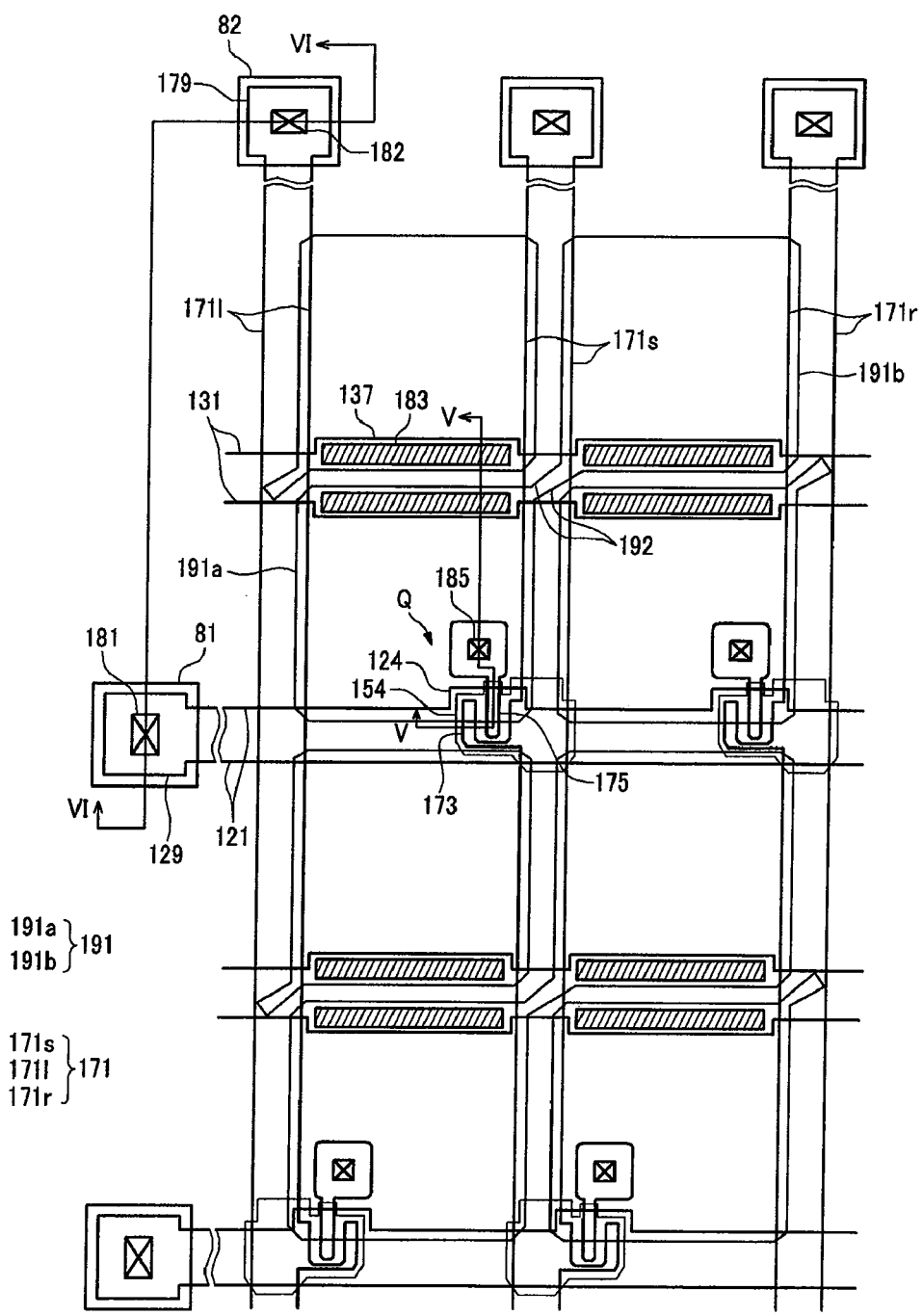
FIG. 4 is a layout view of the liquid crystal panel assembly according to the exemplary embodiment of the present invention.

FIG. 4 is a layout view of the liquid crystal panel assembly according to the exemplary embodiment of the present invention. FIGS. 5 and 6 are cross-sectional views of the liquid crystal panel assembly of FIG. 4 taken along the lines V-V and VI-VI.

Figure 5:
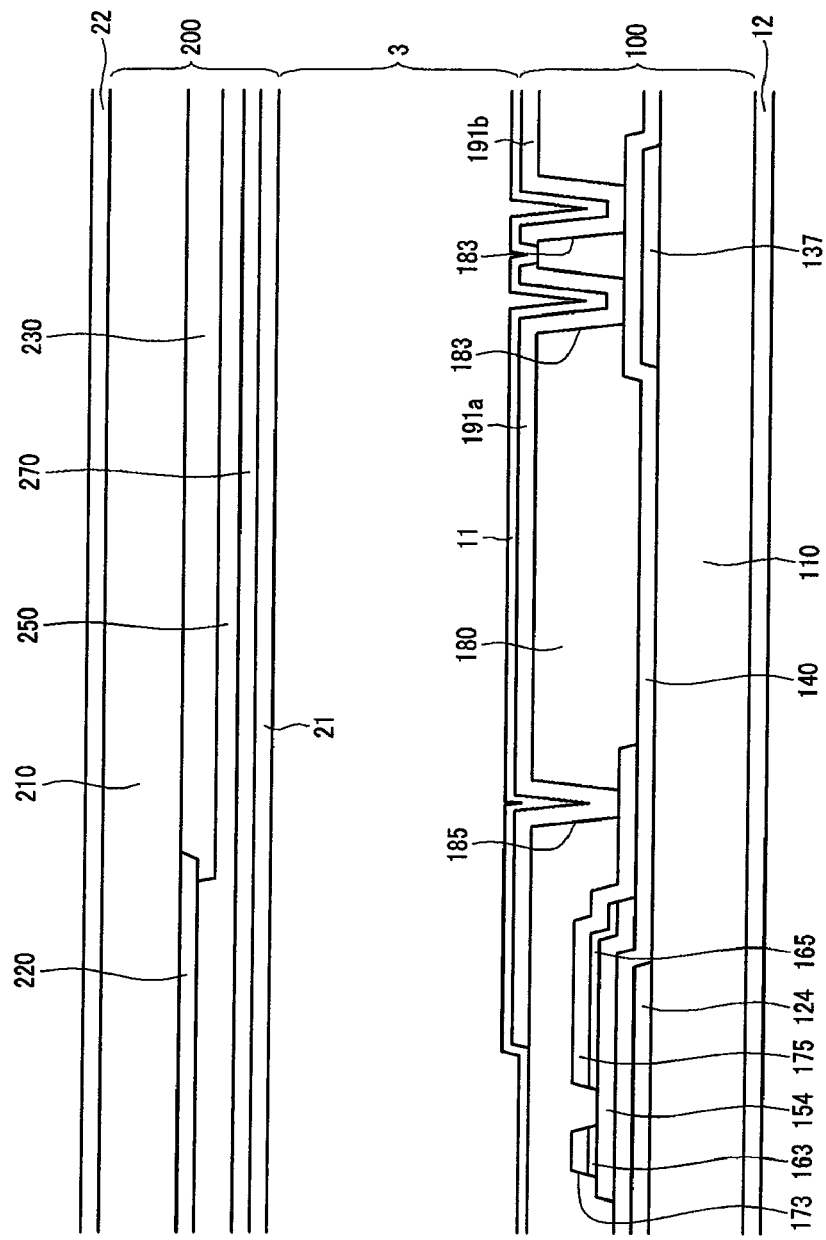
FIGS. 5 and 6 are cross-sectional views of the liquid crystal panel assembly of FIG. 4 taken along the lines V-V and VI-VI.
Figure 6:
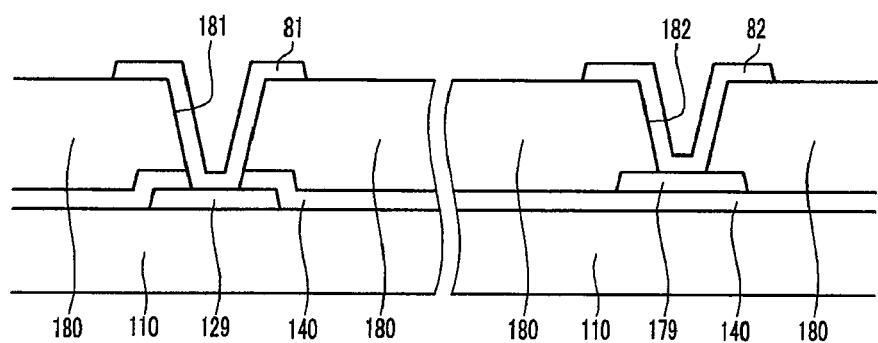

Referring to FIGS. 4 to 6, the liquid crystal panel assembly according to the exemplary embodiment of the present invention includes a lower display panel 100, an upper display panel 200, and a liquid crystal layer 3 interposed therebetween.

First, the lower display panel 100 will be described in detail.

A plurality of gate lines 121 and a plurality of storage electrode lines 131 are formed on an insulation substrate 110 formed of, for example, transparent glass.

The gate lines 121 transmit the gate signals and extend in the horizontal direction. Each of the gate lines 121 includes a plurality of gate electrodes 124 that protrude upward, and a wide end portion 129 that is provided for connection to a different layer or an external driving circuit.

The storage electrode lines 131 are supplied with a predetermined voltage, and substantially extend in parallel with the gate lines 121. Each of the storage electrode lines 131 is disposed between two adjacent gate lines 121 and maintains the same interval from the two gate lines 121. The storage electrode lines 131 include the storage electrodes 137 extending in the vertical direction. However, the shape and alignment of the storage electrode lines 131 may be modified in various ways.

The gate lines 121 and the storage electrode lines 131 may be formed of a conductor having low resistance, for example, an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), tantalum (Ta), or titanium (Ti). The gate lines 121 and the storage electrode lines 131 may have a multi-layered structure including two conductive layers (not shown) whose physical properties are different from each other. Of these, one conductive layer is formed of a metallic material having low resistivity, such as an aluminum-base metal, a silver-base metal, or a copper-based metal, in order to reduce signal delay or voltage drop. In contrast, the other conductive layer is formed of a different material, particularly a material having excellent physical, chemical, and electrical contact characteristics with ITO (Indium Tin Oxide) and IZO (Indium Zinc Oxide), such as a molybdenum-based metal, chromium, titanium, or tantalum. Specific examples of the combination include a combination of a chromium lower layer and an aluminum (alloy) upper layer, and a combination of an aluminum (alloy) lower layer and a molybdenum (alloy) upper layer. Moreover, the gate lines 121 and the storage electrode lines 131 may be formed of various metals or conductors, other than the above materials.

The lateral side's surface of each of the gate lines 121 and the storage electrode lines 131 is inclined with respect to a surface of the substrate 110, and the inclination angle is preferably in a range of about 30° to 80°.

A gate insulating layer 140 made of silicon nitride ($SiN_x$) or silicon oxide ($SiO_x$) is formed on the gate lines 121 and the storage electrode line 131.

A plurality of semiconductor islands 154 formed of hydrogenated amorphous silicon (abbreviated as a-Si) or polycrystalline silicon are formed on the gate insulating layer 140. The semiconductor islands 154 are respectively disposed on the gate electrodes 124.

A plurality of ohmic contacts 163 and 165 are formed on the semiconductor islands 154. The ohmic contacts 163 and 165 may be formed of a material such as n+ hydrogenated amorphous silicon, in which an n-type impurity is doped with high concentration, or of silicide. A plurality of pairs of ohmic contacts 163 and 165 are formed on the semiconductor islands 154.

The lateral sides of each of the semiconductor islands 154 and the ohmic contacts 163 and 165 is inclined with respect to the surface of the substrate 110, and the inclination angle is in a range of about 30° to 80°.

A plurality of data lines 171 and a plurality of drain electrodes 175 are formed on the ohmic contacts 163 and 165 and the gate insulating layer 140.

The data lines 171 transmit data signals and substantially extend in a vertical direction to cross the gate lines 121 and the storage electrode lines 131. Each of the data lines 171 includes a plurality of first and second source electrodes 173 extending toward the gate electrodes 124, and a wide end portion 179 that is provided for connection to a different layer or an external driving circuit.

The drain electrodes 175 are separated from the data lines 171, and face the source electrodes 173 with electrodes 124 as a center, respectively. Each of the drain electrodes 175 includes one end portion having a wide extension and the other end portion having a bar shape which is surrounded by the source electrodes 173 curved in a "U" shape.

One gate electrode 124, one source electrode 173, and one drain electrode 175 form one thin film transistor (TFT) together with the semiconductor island 154. A channel of the thin film transistor is formed in the semiconductor island 154 between the source electrode 173 and the drain electrode 175.

The data line 171 and the drain electrodes 175 are preferably formed of a refractory metal, such as molybdenum, chromium, tantalum, or titanium, or an alloy of them. The data line 171 and the drain electrodes 175 may have a multi-layered structure having a refractory metal layer (not shown) and a low-resistive conductive layer (not shown). Examples of the multi-layered structure includes a two-layered structure of a chromium or molybdenum (alloy) lower layer and an aluminum (alloy) upper layer, and a three-layered structure of a molybdenum (alloy) lower layer, an aluminum (alloy) intermediate layer, and a molybdenum (alloy) upper layer. However, the data line 171 and the drain electrodes 175 may be formed of various materials or conductors, other than the above materials.

Preferably, the lateral sides of each of the data line 171 and the drain electrodes 175 is also inclined with respect to the surface of the substrate 110 at an angle of about 30° to 80°.

The ohmic contacts 163 and 165 are provided only between the underlying semiconductor islands 154 and the overlying data lines 171 and drain electrodes 175 so as to reduce contact resistance therebetween. The semiconductor islands 154 have exposed portions that are not covered with the data line 171 and the drain electrodes 175, including a portion between the source electrode 173 and the drain electrode 175.

A passivation layer 180 is formed on the data line 171, the drain electrodes 175, and the exposed portions of the semiconductor island 154. The passivation layer 180 is formed of an inorganic insulator and may have a flat surface. The inorganic insulator may be exemplified as silicon nitride or silicon oxide. The upper passivation layer 180 may have photosensitivity, and preferably has a dielectric constant of 4.0 or less. However, the passivation layer 180 may have a dual-layered structure having a lower inorganic layer and an upper organic layer so as to utilize the excellent insulating characteristic of the organic film and to not damage the exposed semiconductor island 154.

A plurality of contact holes (contact holes) 182 and 185 are formed in the passivation layer 180 to expose one end of the data lines 171 and the drain electrodes 175. Further, a plurality of contact holes 181 are formed in the passivation layer 180 and the gate insulating layer 140 to expose an end portion 129 of the gate lines 121. Further, an opening 183 is formed in the passivation layer 180 to expose the gate insulating layer 140. The opening 183 overlaps the storage electrode 137.

A plurality of pixel electrodes 191 and a plurality of contact assistants 81 and 82 are formed on the passivation layer 180. These may be formed of a transparent conductive material such as ITO or IZO, or a reflective metal such as aluminum, silver, chromium, or an alloy of them.

The pixel electrode 191 includes first and second sub-pixel electrodes 191a and 191b that face each other in a diagonal direction. In particular, the first sub-pixel electrode 191a is disposed at a lower left portion and the second sub-pixel electrode 191b is disposed at an upper right portion. A second sub-pixel electrode of another pixel electrode is disposed at the upper portion of the first sub-pixel electrode 191a, and a first sub-pixel electrode of another pixel electrode is disposed at the lower portion of the second sub-pixel electrode 191b. The first and second sub-pixel electrodes 191a and 191b are connected to each other through a connection unit 192.

Each of the sub-pixel electrodes 191a and 191b includes a pair of horizontal edges that are parallel to the gate line 121 and a pair of vertical edges that are parallel to the data line 171. The length of each edge of the first sub-pixel electrode 191a is substantially equal to that of each edge of the second sub-pixel electrode 191b. Therefore, the area of the sub-pixel electrode 191a is substantially equal to that of the sub-pixel electrode 191b.

The pixel electrode 191 is physically and electrically connected to the drain electrode 175 through the contact hole 185 so as to be supplied with the data voltage from the drain electrode 175. The pixel electrode 191 to which the data voltage is applied generates an electric field with the common electrode 270 of another display panel 200 (not shown) to which the common voltage is applied, thereby determining a direction of liquid crystal molecules 31 in the liquid crystal layer 3 interposed between the two electrodes 191 and 270. The polarization of light passing through the liquid crystal layer 3 varies on the basis of the direction of the liquid crystal molecules determined as described above. The pixel electrode 191 and the common electrode 270 form a capacitor (hereinafter, referred to as a "liquid crystal capacitor") so as to maintain the applied voltage after the thin film transistor is turned off.

The pixel electrode 191 is opposite to the storage electrode line 131 such as the storage electrode 137 with the gate insulating layer 140 interposed therebetween, thereby forming a storage capacitor. The storage capacitor improves the voltage storage capacity of the liquid crystal capacitor. At this time, since the opening 183 is formed in the passivation layer 180, only the gate insulating layer 140 exists between the pixel electrode 191 and the storage electrode 137. Therefore, the distance between the pixel electrode 191 and the storage electrode line 131 becomes short, and thus the voltage storage capacity is improved.

At least the storage electrode line 131 disposed between the first and second sub-pixel electrodes 191a and 191b extends in a horizontal direction while being overlapped with both the first and second sub-pixel electrodes 191a and 191b. The gate line 121 extends below the first sub-pixel electrodes 191a, while at least parts of the gate line 121 overlap the two first sub-pixel electrodes 191a.

The data line 171 disposed between the first and second sub-pixel electrodes 191a and 191b extends in a vertical direction, while at least parts of the data line 171 overlap both the first and second sub-pixel electrodes 191a and 191b. Among a plurality of data lines 171, the data line 171 connected to the pixel electrode 191 through the contact hole 185 is referred to as a first data line 171s. The data line 171 adjacent to the left of the first data line 171s is referred to as a second data line 171l, and the data line 171 adjacent to the right of the first data line 171s is referred to as the third data line 171r. At this time, each of the first and second sub-pixel electrodes 191a and 191b overlaps the first data line 171s, the first sub-pixel electrode 191a overlaps the second data line 171l, and the second sub-pixel electrode 191b overlaps the third data line 171r.

The contact assistant 81 is connected to the end portion 129 of the gate line 121 through the contact hole 181, and the contact assistant 82 is connected to the end portion 179 of the data line 171 through the contact hole 182. The contact assistants 81 and 82 supplement the adhesive property between the end portion 129 of the gate line 121 and the external device and between the end portion 179 of the data line 171 and the external device.

Next, the upper display panel 200 will be explained.

A light blocking member 220 is formed on an insulation substrate 210 formed of, for example, transparent glass or plastic. The light blocking member 220 may include curved portions (not shown) corresponding to the curved edges of the pixel electrode 191, and quadrangle portions (not shown) corresponding to the thin film transistor. The light blocking member 220 prevents light leakage between the pixel electrodes 191 and defines an opening region which faces the pixel electrode 191.

A plurality of color filters 230 are formed on the substrate 210 and the light blocking member 220. Most of the plurality of color filters 230 exist in a region surrounded by the light blocking member 220 and may extend along a column of pixel electrodes 191. Each of the color filters 230 may display one of three primary colors, such as red, green, and blue.

An overcoat 250 is formed on the color filter 230 and the light blocking member 220. The overcoat 250 may be formed of an organic insulator and functions to prevent the color filter 230 from being exposed and supply a flat surface. The overcoat 250 may be omitted.

The common electrode 270 is formed on the overcoat 250. The common electrode 270 is formed of a transparent conductor such as ITO or IZO.

Alignment layers 11 and 21 may be formed inside the display panels 100 and 200. These alignment layers 11 and 21 may be vertical alignment layers.

Polarizers (not shown) may be formed outside the display panels 100 and 200. It is preferable that polarization axes of two polarizers be perpendicular to each other and have an angle of 45° with the curved edge of the sub-pixel electrodes 191a and 191b. In a case of a reflective liquid crystal display, one of the two polarizers may be omitted.

The liquid crystal display may include the polarizers 12 and 22, retardation films, the display panels 100 and 200, and a backlight unit (not shown) that supplies light to the liquid crystal layer 3.

The liquid crystal layer 3 has positive dielectric anisotropy. The liquid crystal molecules of the liquid crystal layer 3 are arranged to be parallel to the upper and lower display panels when no electric field is applied.

Overcoming an alignment error occurring in the liquid crystal panel assembly will be described in detail with reference to FIG. 7.

Figure 7:
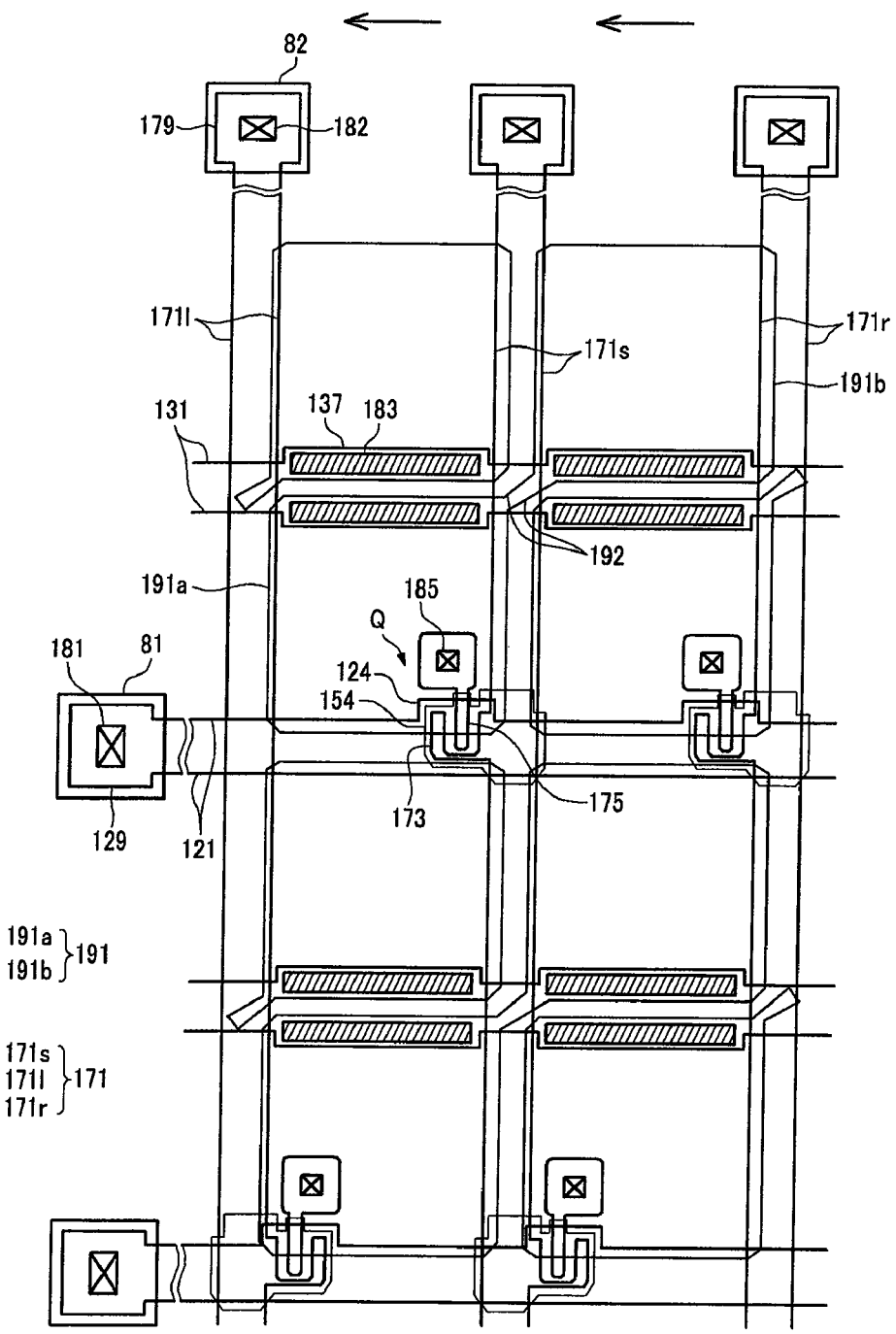
FIG. 7 is a layout view illustrating an alignment error occurring in the manufacturing process of the liquid crystal display shown in FIG. 4.

FIG. 7 is a layout view illustrating a case where the alignment error occurs at the manufacturing process of the liquid crystal display shown in FIG. 4.

Referring to FIG. 7, all the data lines 171 are arranged while being inclined to the left side, as compared with the FIG. 4

Therefore, the overlapped area between the data line 171 and the pixel electrode 191 is different from the overlapped area shown in FIG. 4.

Parasitic capacitance is present between the data line 171 and the pixel electrode 191 which may affect the pixel electrode voltage. When data voltages having opposite polarities are applied to every two adjacent data lines 171, the parasitic capacitances between each of the adjacent data lines 171 and the pixel electrode 191 are oppositely charged. Therefore, areas where one pixel electrode 191 overlaps the two data lines 171 to which opposite polarity data voltages are applied, the charge on the parasitic capacitance is neutralized. However, if an alignment error occurs between each of the data lines 171 and the pixel electrode 191, the areas where the pixel electrode 191 overlaps the two data lines 171 are different from each other. Accordingly, the voltages of some of the pixel electrodes 191 may be lower or higher and the charge on the parasitic capacitance is not neutralized and the stripe defect occurs.

However, as described in the exemplary embodiment of the present invention, the stripe defect may be avoided by making the pixel electrode 191 include a first and a second sub-pixel electrode 191a and 191b that face each other in the diagonal direction.

As shown in FIG. 7, when the alignment error occurs, the area in which the first sub-pixel electrode 191a overlaps the first data line 171s increases, but the area in which the second sub-pixel electrode 191b overlaps the first data line 171s decreases. That is, even though the alignment error occurs, the area where the pixel electrode 191 overlaps the first data line 171s to which a positive data voltage is applied is not changed. Further, even though the area in which the first sub-pixel electrode 191a overlaps the second data line 171l decreases, the area in which the second sub-pixel electrode 191a overlaps the third data line 171r increases. That is, even though the alignment error occurs, the area where the pixel electrode 191 overlaps the second or third data lines 171l and 171r to which a negative data voltage is applied is not changed. Therefore, the charge on the parasitic capacitance between the pixel electrode 191 and the data line 171 may be neutralized.

Hereinafter, a liquid crystal panel assembly according to another exemplary embodiment of the present invention will be described with reference to FIG. 8.

Figure 8:
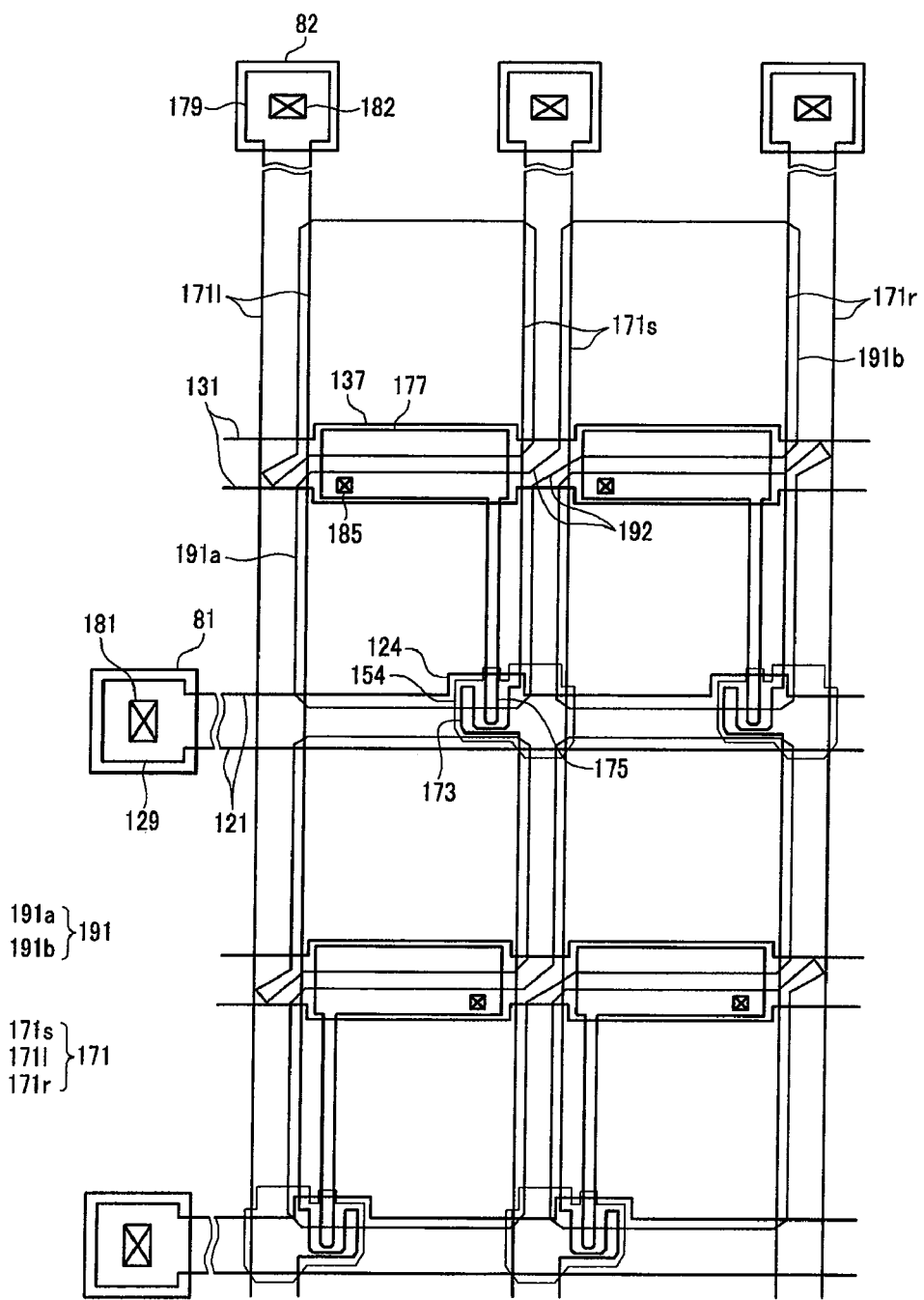
FIG. 8 is a layout view of a liquid crystal panel assembly according to another exemplary embodiment of the present invention.

FIG. 8 is a layout view of the liquid crystal panel assembly according to another exemplary embodiment of the present invention.

Referring to FIG. 8, the liquid crystal panel assembly according to this exemplary embodiment of the present invention includes a lower display panel (not shown) and an upper display panel (not shown) that face each other, a liquid crystal layer (not shown) interposed therebetween, and a pair of polarizers (not shown) attached outside the display panels.

The layered structure of the liquid crystal panel assembly according to this exemplary embodiment of the present invention is substantially the same as the layered structure of the liquid crystal panel assembly shown in FIGS. 4 to 6.

Hereinafter, the lower display panel will be described. A plurality of gate conductors that include a plurality of gate lines 121 and a plurality of storage electrode lines 131 are formed on an insulation substrate (not shown). Each of the gate lines 121 includes gate electrodes 124 and end portions 129. A gate insulating layer (not shown) is formed on the gate conductor 121. A semiconductor island 154 is formed on the gate insulating layer (not shown). Further, a plurality of ohmic contacts (not shown) is formed on the semiconductor island 154. The data lines 171 and the drain electrodes 175 which include source electrodes 173 and end portions 179 are formed on the ohmic contacts (not shown) and on the gate insulating layer 140 (not shown). A passivation layer (not shown) is formed on the data conductors 171 and 175 and the exposed semiconductor islands 154. Further, the contact holes 181, 182, and 185 are formed on the passivation layer and the gate insulating layer. The pixel electrodes 191 and contact assistants 81 and 82 are formed on the passivation layer 180. Further, an alignment film (not shown) is formed on the pixel electrodes 191, the contact assistants 81 and 82, and the passivation layer 180.

Hereinafter, the upper display panel will be described. A light blocking member (not shown), color filters (not shown), an overcoat (not shown), a common electrode (not shown), and an alignment film (not shown) are formed on the insulation substrate (not shown).

However, the liquid crystal panel assembly shown in FIG. 8 is different from the liquid crystal panel assembly shown in FIGS. 4 to 6 in that the openings are not formed in the passivation layer 180 at portions where the storage electrodes 137 overlap the pixel electrodes 191. Further, the drain electrodes 175 each include one end portion 177 having a wide extension that is opposite to the other end portion having a bar shape that is surrounded by the source electrodes 173. The end portions 177 having a wide extension of the drain electrodes 175 overlap the storage electrodes 137.

Each end portion 177 having a wide extension of the drain electrodes 175 and the pixel electrodes 191 overlaps a storage electrode 137 and a storage electrode line 131 so as to form the storage capacitor Cst. Further, the end portion 177 having a wide extension of the drain electrodes 175 improves the capacitance of the storage capacitor Cst.

Next, a liquid crystal panel assembly according to another exemplary embodiment of the present invention will be described in detail with reference to FIGS. 9 and 10.

Figure 9:
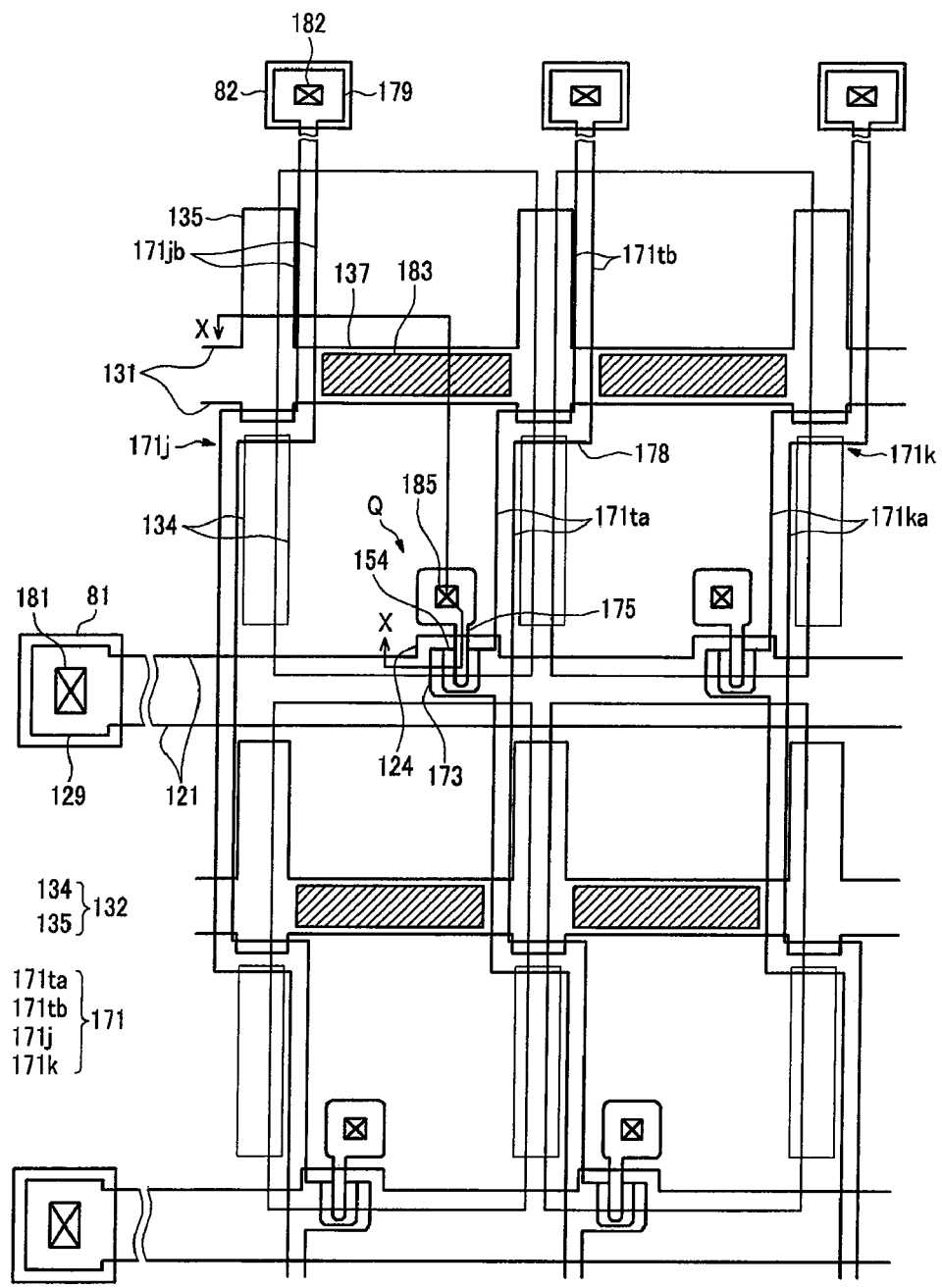
FIG. 9 is a layout view of a liquid crystal panel assembly according to another exemplary embodiment of the present invention.

FIG. 9 is a layout view of a liquid crystal panel assembly according to another exemplary embodiment of the present invention. FIG. 10 is a cross-sectional view of the liquid crystal panel assembly shown in FIG. 9 taken along the line -.

The liquid crystal panel assembly according to the present exemplary embodiment includes lower and upper display panels 100 and 200 that face each other, a liquid crystal layer 3 that is interposed between the lower and upper display panels 100 and 200, and a pair of polarizers 12 and 22.

The layered structure of the liquid crystal panel assembly according to the present exemplary embodiment is substantially the same as the layered structure of the liquid crystal panel assembly shown in FIGS. 4 to 6.

Hereinafter, the lower display panel 100 will be described. A plurality of gate conductors that include a plurality of gate lines 121 and a plurality of storage electrode lines 131 are formed on the insulation substrate 110. The gate lines 121 include gate electrodes 124 and end portions 129. A gate insulating layer 140 is formed on the gate conductor 121. A semiconductor stripe 151 including a protruding portion 154 is formed on the gate insulating layer 140. Further, a plurality of ohmic contacts 163 and 165 are formed on the semiconductor stripe 151. The source electrodes 173, the data lines 171 that include end portions 179, and the drain electrodes 175 are formed on the ohmic contacts 161, 163, and 165 and the gate insulating layer 140.

A lower passivation layer 180$p$, a color filter 230, and an upper passivation layer 180$q$ are formed on the data conductors 171 and 175 and the exposed semiconductor islands 154. Further, the contact holes 181, 182, 185$p$, and 185$q$ are formed in the lower and upper passivation layers 180$p$ and 180$q$ and the gate insulating layer 140. The openings 183$p$ and 183$q$ are formed in the lower and upper passivation layers 180$p$ and 180$q$. The pixel electrodes 191 and contact assistants 81 and 82 are formed on the passivation layer 180. Further, an alignment film 11 is formed on the pixel electrodes 191, the contact assistants 81 and 82, and the passivation layer 180.

Hereinafter, the upper display panel will be described. A light blocking member 220, an overcoat 250, a common electrode 270, and an alignment layer 21 are formed on the insulation substrate 210.

Figure 10:
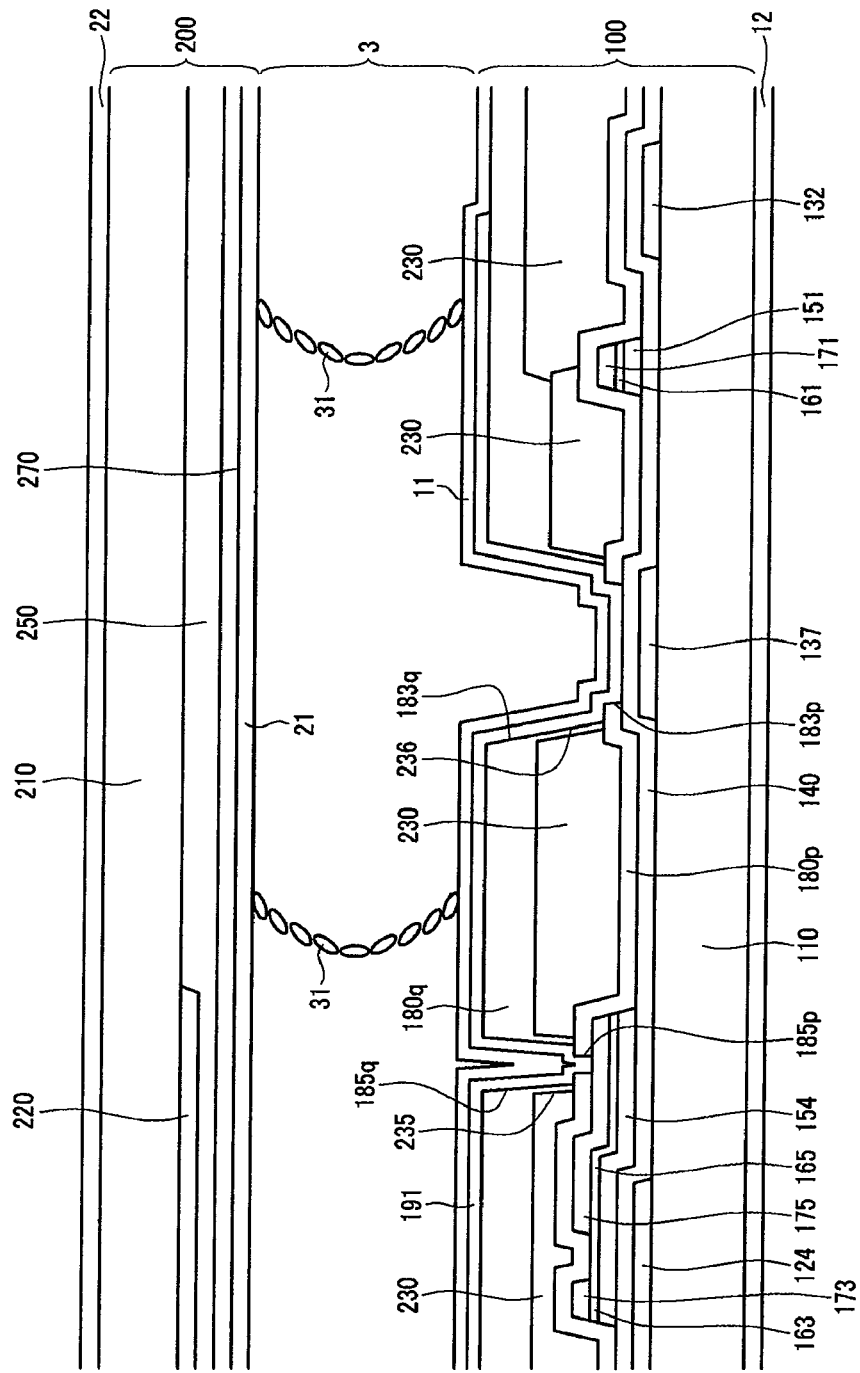
FIG. 10 is a cross-sectional view of the liquid crystal panel assembly shown in FIG. 9 taken along the line IX-IX.

The liquid crystal panel assembly shown in FIGS. 9 and 10 is different from the liquid crystal panel assembly shown in FIGS. 4 to 6 in that the pixel electrodes 191 are not separated and a region defined by the data lines 171 and the gate lines 121 has a rectangular shape.

Each data line 171 includes a first portion 171$ta$ and a second portion 171$tb$ that are not connected in a straight line. The first portion 171$ta$ is connected to the second portion 171$tb$ through a connection portion 178. The entire surface of the first portion 171$ta$ overlaps a part of the pixel electrode 191 that supplies the data voltage, and the entire surface of the second portion 171$tb$ overlaps a part of an adjacent pixel electrode 191 that does not supply the data voltage.

On the basis of one pixel electrode 191, a fourth data line 171$t$ indicates the data line 171 connected through the thin film transistor Q and a fifth data line 171$j$ indicates the data line 171 adjacent to the left side of the fourth data line 171$t$. Further, a sixth data line 171$k$ indicates the data line 171 adjacent to the right side of the fourth data line 171$t$. Therefore, one pixel electrode 191 overlaps the entire second portion 171$tb$ of the fourth data line 171$t$ and the entire first portion 171$ja$ of the fifth data line 171$j$. On the basis of two adjacent pixel electrodes 191, the second portion 171$tb$ of the fourth data line 171$t$ completely overlaps the first portion 171$ka$ of the sixth data line 171$k$. That is, one pixel electrode 191 overlaps two adjacent data lines 171 to which data voltages having opposite polarities are applied.

Further, a light blocking member 132 is formed between adjacent pixel electrodes 191. The light blocking member 132 includes a first light blocking member 134 that is adjacent to the first portion 171$ta$ of the data line 171$t$ and a second light blocking member 135 that is adjacent to the second portion 171$tb$ of the data line 171$t$. The first light blocking member 134 is separated from the second light blocking member 135, and the second light blocking member 135 extends from the storage electrode line 131. The light blocking member 132 is formed of the same material as the storage electrode line 131.

As described above, the data line 171 overlaps the pixel electrodes 191. Therefore, a space is formed between the pixel electrodes 191. A horizontal direction electric field is formed in the space between the two pixel electrodes 191 such that the liquid crystal molecules in the liquid crystal layer 3 are arranged in an unexpected direction, that is, in the horizontal direction. Then, light passes through this portion, which causes light leakage. The light blocking member 132 blocks light to prevent the light leakage.

Further, the semiconductor island 154 extends along the data lines 171 and the drain electrodes 175 to form a semiconductor stripe 151, and an ohmic contact 163 extends along the data lines 171 to form an ohmic contact stripe 161. The semiconductor stripe 151 has substantially the same shape as those of the data lines 171, the drain electrodes 175, and the ohmic contacts 161 and 165 under the drain electrodes 175 in a plan view.

According to a method of manufacturing a thin film transistor display panel according to an exemplary embodiment of the present invention, the data lines 171, the drain electrodes 175, the semiconductor stripe 151, and the ohmic contacts 161 and 165 are formed by one photolithography process.

A photosensitive film used for the photolithography process has different thicknesses depending on position, and includes a first portion and a second portion in a descending order of thickness. The first portion is disposed in a wiring region where the data line 171 and the drain electrode 175 are disposed, and the second portion is disposed in a channel region of the thin film transistor.

The thickness of the photosensitive film may differ according to a plurality of methods. For example, the thickness of the photosensitive film may differ by providing a light transmitting area, a light blocking area, and a translucent area with an optical mask. A slit pattern, a lattice pattern, or a thin film having medium transmittance or medium thickness is provided on the translucent area. When using the slit pattern, it is preferable that the width of the slit or the interval between the slits is smaller than the resolution of the light exposer used for the photolithography process. Alternatively, a reflowable photosensitive film may be used. That is, the reflowable photosensitive film is formed by using a general exposure mask having a light transmitting area and a light blocking area. Then, the reflowable photosensitive film is reflowed such that the photosensitive film flows to a region where the photosensitive film does not remain.

With the above-described processing, the photolithography processes may be reduced, thereby making the manufacturing method simple.

The liquid crystal panel assembly according to the present exemplary embodiment is different from the liquid crystal panel assembly described above. That is, the color filters are not provided on the upper display panel 200, but a plurality of color filters 230 are formed below the passivation layer 180 of the lower display panel 100.

The color filters 230 extend in a vertical directional while being periodically curved along the column of the pixel electrode 191. The color filter 230 does not exist in peripheral areas in which the end portion 129 of the gate line 121 and the end portion 179 of the data line 171 are disposed. The contact hole 185$q$ and the opening 183$q$ pass through the color filter 230. The penetration holes 235 and 236 that are larger than the contact hole 185$q$ and the opening 183$q$ are formed in the color filter 230.

The adjacent color filters 230 may function as the light blocking member for blocking light leakage between the adjacent pixel electrodes 191 that overlap the data line 171. In this case, the light blocking member on the upper display panel 200 may be omitted, thereby making the process simple. The passivation layer 180$p$ is formed below the color filter 230. The overcoat 250 of the common electrode panel 200 may be omitted.

The liquid crystal layer 3 of the liquid crystal display according to the present exemplary embodiment includes nematic liquid crystal with positive dielectric anisotropy. The liquid crystal molecules in the liquid crystal layer 3 of the liquid crystal display according to the present exemplary embodiment are splay-arranged and then bend-arranged due to a bend voltage as shown in FIG. 9 so as to drive the display. A liquid crystal display including the liquid crystal layer 3 having the above-described liquid crystal molecules 31 is called an OCB (optically compensated bend) mode display. The liquid crystal display assembly driven in the OCB mode operates a normally white mode. That is, the liquid crystal display assembly displays a white color when no voltage is applied.

Hereinafter, the OCB mode will be described in detail with reference to FIGS. 11 and 12.

Figure 11:
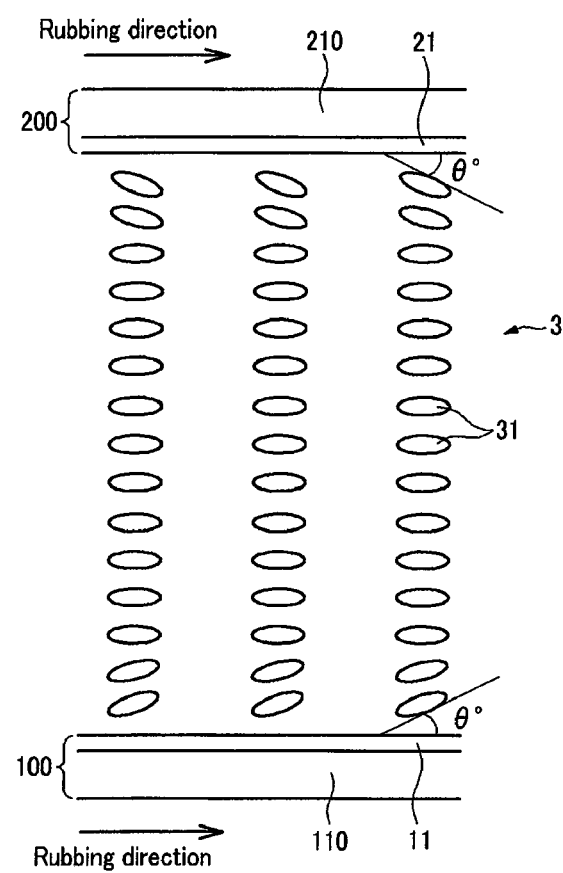
FIG. 11 is a view illustrating an alignment state of the liquid crystal molecules of a liquid crystal display according to another exemplary embodiment of the present invention before a predetermined voltage is applied.

FIG. 11 is a view illustrating an alignment state of the liquid crystal molecules before a predetermined voltage is applied. FIG. 12 is a view illustrating an alignment state of the liquid crystal molecules after the predetermined voltage is applied.

Referring to FIG. 11, when the voltage is not applied, the liquid crystal molecules 31 in the vicinity of alignment layers 11 and 21 are arranged in a horizontal direction at a pre-tilt angle θ, in which one end of the liquid crystal molecule rises toward a rubbing direction. Therefore, the liquid crystal molecules 31 are arranged in parallel to the surface of the substrates 110 and 210 and are symmetrical with respect to a surface that is separated from the surfaces of the two alignment layers 11 and 21 at the same distance (hereinafter, referred to as a "center surface"). This alignment is called a splay alignment.

In the above-described state, if a predetermined voltage, that is, a bend voltage, is applied to the liquid crystal molecules 31, an electric field is generated in the liquid crystal layer 3 and the alignment of the liquid crystal molecule 31 is changed from the splay alignment to another alignment.

More specifically, when a voltage is applied to the electrodes (not shown) of the two display panels 100 and 200 and the electric field that is vertical to the surfaces of the two display panels 100 and 200 is generated in the liquid crystal layer 3, the liquid crystal molecules 31 in the vicinity of the alignment films 11 and 21 react to the electric field and rise. However, since the rising directions of the liquid crystal molecules 31 in the vicinity of the two alignment films 11 and 21 are the same, the rising directions of the liquid crystal molecules 31 collide with each other at the middle portion of the liquid crystal layer 3, causing a large stress. Therefore, the alignment of the liquid crystal molecules 31 changes to a twist alignment which is stable from the viewpoint of energy. This is called a transient splay alignment.

Figure 12:
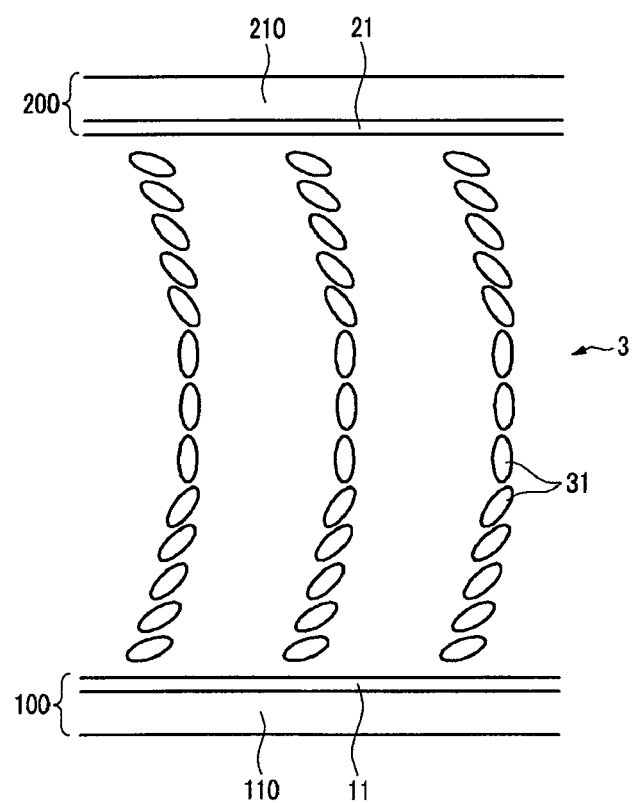
FIG. 12 is a view illustrating an alignment state of the liquid crystal molecules of a liquid crystal display according to another exemplary embodiment of the present invention after the predetermined voltage is applied.

In this state, as shown in FIG. 12, when a higher electric field is applied, the alignment of the liquid crystal molecules 31 of the liquid crystal layer changes to a bend alignment. The alignment transition of the liquid crystal molecules 31 should uniformly occur in all the liquid crystal capacitors Clc of the liquid crystal panel assembly 300.

The characteristics of the liquid crystal panel assembly shown in FIGS. 4 to 6 may be applied to the liquid crystal panel assembly shown in FIGS. 9 and 10.

Hereinafter, a case where the alignment error occurs in the liquid crystal panel assembly according to another exemplary embodiment of the present invention will be described in detail with reference to FIG. 13.

Figure 13:
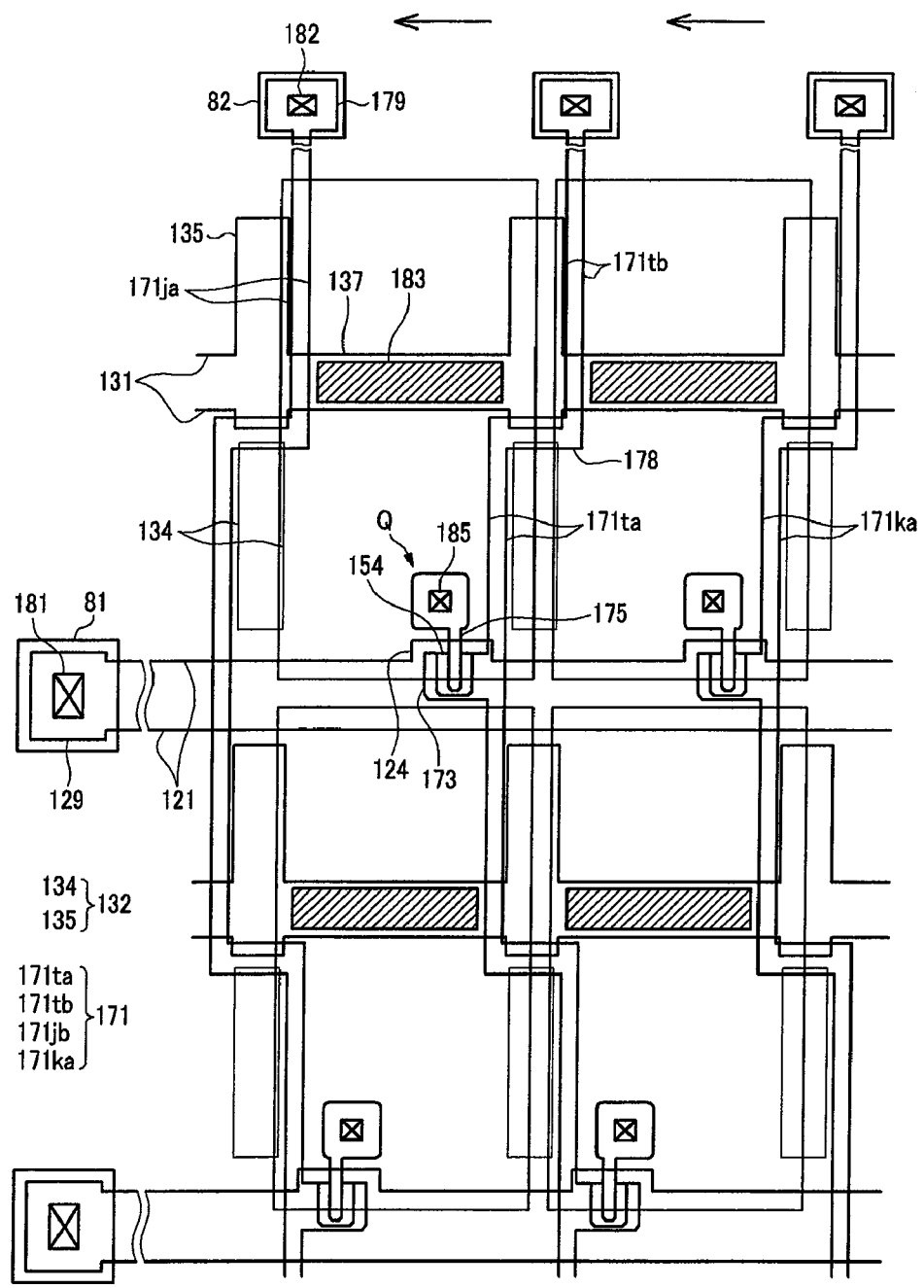
FIG. 13 is a layout view illustrating an alignment error occurring in the liquid crystal panel assembly shown in FIG. 9.

FIG. 13 is a layout view illustrating a case where the alignment error occurs in the liquid crystal panel assembly shown in FIG. 9.

Referring to FIG. 13, all the data lines 171 are arranged while being inclined to the left side based on the pixel electrodes 191 as compared with FIG. 9. Therefore, the overlapped area between the data line 171 and the pixel electrode 191 is different from the overlapped area shown in FIG. 9

Since the pixel electrode 191 sufficiently overlaps the first portion 171*ta* of the fourth data line 171*t* and the second portion 171*jb* of the fifth data line 171*j*, the overlapped area between the pixel electrode 191 and the fourth data line 171*t* and the fifth data line 171*j* to which the positive data voltage is applied is not changed even when the alignment error shown in FIG. 10 occurs. Therefore, the positive parasitic capacitance and the negative parasitic capacitance between the pixel electrode 191 and the data line 171 are maintained to be the same as each other. Accordingly, it is possible to remove the parasitic capacitance generated between the pixel electrode 191 and the data line 171.

According to the present invention, it is possible to prevent a coupling defect or a stripe defect while sufficiently securing the aperture ratio of the liquid crystal display.

While this invention has been described in connection with what is presently considered to be practical exemplary embodiments, it is to be understood that the invention is not limited to the disclosed embodiments, but, on the contrary, is intended to cover various modifications and equivalent alignments included within the spirit and scope of the appended claims.

What is claimed is:

1. A liquid crystal display comprising:
   a substrate;
   a gate line disposed on the substrate;
   a data line intersecting with the gate line;
   a thin film transistor connected to the gate line and the data line;
   a first pixel electrode connected to the thin film transistor;
   a second pixel electrode disposed adjacent to the first pixel electrode;
   a storage electrode line disposed to be substantially parallel with the gate line; and
   a first light blocking member connected to the storage electrode,
   wherein the data line is arranged between the first pixel electrode and the second pixel electrode,
   wherein the data line comprises a first region overlapping the first pixel electrode, a second region overlapping the second pixel electrode, and a third region connecting between the first region and the second region, and
   wherein the first light blocking member does not overlap the first region and the second region.

2. The liquid crystal display of claim 1, wherein pixel electrodes disposed in a same column are alternatively connected to adjacent data lines configured to supply data voltages having opposite polarities with respect to a common voltage.

3. The liquid crystal display of claim 1, further comprising:
   a second light blocking member disposed between the second pixel electrode and the first region of the data line,
   wherein the first light blocking member is disposed between the first pixel electrode and the second region of the data line.

4. The liquid crystal display of claim 3, wherein the first light blocking member and the second light blocking member are disconnected in a portion overlapping the third region of the data line.

5. The liquid crystal display of claim 4, wherein the storage electrode line is disconnected with the second light blocking member.

6. The liquid crystal display of claim 3, wherein the second light blocking member does not overlap the first region and the second region.

7. The liquid crystal display of claim 3, wherein the first light blocking member overlaps the third region.

8. The liquid crystal display of claim 3, wherein the second light blocking member overlaps the third region.

9. The liquid crystal display of claim 1, wherein the third region is substantially parallel with the gate line.

* * * * *